US005455307A

United States Patent [19]
Terry et al.

[11] Patent Number: 5,455,307
[45] Date of Patent: Oct. 3, 1995

[54] POLYMERIC STABILIZERS FOR POLYOLEFINS

[75] Inventors: Donna J. Terry, Houston; Avinash C. Gadkari, Webster, both of Tex.

[73] Assignee: Exxon Chemical Patents Inc., Wilmington, Del.

[21] Appl. No.: 862,683

[22] Filed: Apr. 3, 1992

[51] Int. Cl.$^6$ .............................. C08F 8/00; C08F 10/00; C08F 8/10

[52] U.S. Cl. ....................... 525/333.7; 525/331.7; 525/333.9; 525/342; 525/343; 525/383; 525/384

[58] Field of Search ................... 525/211, 331.7, 525/331.8, 333.9, 384, 343, 383, 333.7, 342

[56] References Cited

U.S. PATENT DOCUMENTS

| | | | |
|---|---|---|---|
| 3,110,699 | 11/1963 | Josten | 525/384 |
| 3,825,523 | 7/1974 | Iwata et al. | 525/384 |
| 4,216,099 | 8/1980 | Steckel | 252/33.6 |
| 4,238,628 | 12/1980 | Cahill et al. | 568/736 |
| 4,320,021 | 3/1982 | Lange | 564/418 |
| 4,429,099 | 1/1984 | Kennedy et al. | 528/98 |
| 4,499,243 | 2/1985 | Rader | 525/384 |
| 4,791,170 | 12/1988 | Makino et al. | 524/323 |
| 5,237,012 | 8/1993 | Wong | 525/384 |
| 5,252,677 | 10/1993 | Tomita et al. | 525/333.9 |

FOREIGN PATENT DOCUMENTS

| | | |
|---|---|---|
| 277004A1 | 8/1988 | European Pat. Off. . |
| 277003A1 | 8/1988 | European Pat. Off. . |
| 295026 | 12/1988 | European Pat. Off. . |
| 418556 | 3/1991 | European Pat. Off. . |
| 487278 | 5/1992 | European Pat. Off. . |
| 2452916 | 5/1975 | Germany . |
| 1159368 | 7/1969 | United Kingdom . |
| 1483067 | 8/1977 | United Kingdom . |

OTHER PUBLICATIONS

"Antioxidants", Modern Plastics Encyclopedia, A. Patel, pp. 106–107, 1984–1985.
"Heat Stabilizers", Modern Plastics Encyclopedia, S. D. Brilliant, pp. 150–152, 1984–1985.

*Primary Examiner*—Tae H. Yoon
*Attorney, Agent, or Firm*—M. Susan Spiering; Catherine L. Bell; Frank E. Reid

[57] ABSTRACT

The present invention provides for polymeric stabilizers which are the acid-catalyzed reaction product of a phenolic compound or a ring substituted aromatic compound and an olefin polymer containing either terminal unsaturation and/or pendant unsaturation along the polymer chain. These stabilizers are readily compatible with olefin polymer and copolymer matrixes and offer good protection of the matrix polymer against one or more of heat, oxygen, ultra violet or radiation degradation. Other advantages include low volatilization as well as low tendency to migrate from the polymer matrix.

28 Claims, No Drawings

POLYMERIC STABILIZERS FOR POLYOLEFINS

BACKGROUND OF THE INVENTION

1. Field of the Invention

This invention relates to a novel class of polymeric stabilizers based on the reaction product of an unsaturated olefin polymer and a substituted aromatic or phenolic compound, and the use of these reaction products as stabilizers for olefin polymers.

2. Description of Related Art

Certain phenolic compounds and derivatives thereof have been used to stabilize olefin polymers against polymer breakdown caused by processing these polymers at high temperatures. Examples of such materials would include alkylated monophenols, alkylated hydroquinones, alkyl substituted bis phenols and hindered phenolic benzyl compounds.

Several problems are associated with the use of these materials. They are generally not very compatible with olefin polymers due to their aromatic structure and also due to the presence of one or more polar (hydroxy) substituents in the aromatic nucleus. Thus it may be difficult to uniformly disperse the phenolic stabilizer within the polymer matrix or prevent it from migrating out of the polymer. Secondly, these materials are quite volatile at temperatures at which the matrix polymer is processed and/or extruded, and consequently a significant loss of stabilizer may be realized during the polymer processing due to evaporation.

It has been proposed in the prior art that the problem of volatility and, to some degree, compatibility can be minimized by providing phenolic-based stabilizers which are themselves polymeric. For example, British patent specification 1483067 discloses polymeric stabilizers prepared by reacting a phenolic compound with a liquid polymeric material such as polypropylene or polybutene in the presence of a Friedel-Crafts type catalyst to provide a phenol compound alkylated with the polymer reactant. These polymer reaction products are said to have little volatility at temperatures employed in polymer processing (200°–280° C.) and to be more compatible with a polymer matrix because of suitable matching of the polymer chain joined to the molecule of the phenol and the matrix polymer.

Alkylated phenols similar to those described above are also disclosed in British Patent Specification 1159368 wherein the polymeric alkylating agent may also include low molecular weight liquid polypropylene as well as higher molecular weight polyolefins such as polybutene and butyl rubber.

The stabilizers referred to above suffer from the deficiency that they are either very low molecular weight amorphous materials (polymer Mn below about 500) or that the degree to which the phenolic compounds are alkylated is difficult to control. Also, in the case of British Specification 1,159,368, the positioning of the phenolic substituent groups along higher molecular weight polymer chains can not be readily tailored but is rather an arbitrary function of the reaction chemistry. These variables can effect the compatability of the polymeric stabilizers with the matrix olefin-based polymers to which they are added to impart stability, as well as the physical properties of the matrix polymers.

Summary of the Invention

The present invention provides for polymeric stabilizers which are the acid-catalyzed reaction product of a phenolic compound or a ring substituted aromatic compound and an olefin polymer containing either terminal unsaturation and/or pendant unsaturation along the polymer chain. These stabilizers are readily compatible with olefin polymer and copolymer matrixes and offer good protection of the matrix polymer against one or more of heat, oxygen, ultra violet or radiation degradation. Other advantages include low volatilization as well as low tendency to migrate from the polymer matrix.

DETAILED DESCRIPTION OF THE INVENTION

Olefin polymers which are used to prepare the stabilizers of the present invention may be characterized as amorphous or crystalline homopolymers or copolymers of $C_1$ to $C_{20}$ monoolefins or copolymers of one or more $C_1$ to $C_6$ monoolefins with a non-conjugated diene wherein the polymer chains contain residual double bonds either at terminal positions on the polymer chain in the case of polymers based solely on monoolefins and/or at random positions along the polymer chain as in the case of non-conjugated diene-containing olefin polymers. These double bond sites which may comprise ethenylidene (vinyl or vinylidene) type unsaturation, serve as the reaction sites for facile electrophilic aromatic substitution reactions with phenolic compounds or ring substituted aromatic compounds as hereinafter described, to produce polymer alkylated phenolics or aromatics useful as stabilizers for olefin polymers.

A first category of olefin polymer which may be used to prepare the stabilizers of this invention are the amorphous, elastomeric copolymers containing from about 30 to about 70wt % ethylene, from about 0.5 to about 12% by weight of non conjugated diene and the balance being one or a mixture of $C_3$ to $C_{20}$ mono olefines. Preferred of the $C_3$ to $C_{20}$ monoolefins are $C_3$ to $C_8$ monoolefins including propylene, butene-1 and hexene-1. These materials may be produced by solution polymerization of the monomers using the well known conventional Ziegler/Natta catalyst systems which include an organo aluminum/transition metal halide catalyst system. The resulting copolymers may be characterized as essentially random copolymers having residual ethylenic unsaturation along the polymer chain by virtue of unreacted double bonds present in the diene component of the copolymer. These polymers are distinguished from the olefin polymers containing terminal monoolefinic unsaturation discussed below in that they do not contain terminal monoolefinic unsaturation.

Non conjugated dienes which may be used to prepare these elastomeric olefin copolymers can be straight chain hydrocarbon di-olefins or cycloalkenyl-substituted alkenes, having about 6 to about 15 carbon atoms, for example:

A. straight chain acyclic dienes, such as 1,4-hexadiene and 1,6-octadiene;

B. branched chain acyclic dienes, such as 5-methyl-1,4-hexadiene; 3,7-dimethyl-1,6-octadiene; 3,7-dimethyl-1,7-octadiene; and the mixed isomers of dihydromyricene and dihydroocinene;

C. single ring alicyclic dienes, such as 1,3-cyclohexadiene; 1,5-cyclooctadiene and 1,5-cyclododecadiene;

D. multi-ring alicyclic fused and bridged ring dienes, such as tetrahydroindene; methyltetra-hydroindene; dicyclopentadiene; bicyclo-(2.2.1) - hepta-2,5-diene; alkenyl, alkylidene, cycloalkenyl and cycloalkylidene norbornenes, such as 5-methylene-2-norbornene (MNB), 5-ethylidene-2-norbornene (ENB), 5-propenyl-2-norbornene, 5-isopropylidene-2- norbornene, 5-(4-cyclopentenyl)-2-norbornene, 5- cyclohexylidene-2-norbornene and 5-vinyl-2-norbornene;

E. cycloalkenyl-substituted alkenes, such as alkyl cyclohexene, vinyl cyclooctene, alkyl cyclodecene, and vinyl cyclodoecene.

Of these, the preferred dienes are dicyclopentadiene, 1,4-hexadiene, 5-methylene-2- norbornene, and 5-ethylidene-2- norbornene. It will be apparent that a mixture of such dienes can also be utilized. The content of the diene monomer in the ethylene-containing elastomeric polymer can be 0.5 to about 12 weight percent, and most preferably about 1.0 to about 6.0 weight percent.

The polymerization reaction used for preparing these copolymers is conventional. The polymerization reaction can be carried out at any temperature suitable for Ziegler catalysis such as a temperature of about-50° C. to about 150° C., or preferably about 10° C. to about 100° C. and more preferably about 0° C. to about 60° C. The pressure used in the polymerization process can vary from about 0 KPa to about 1500 KPa, most preferably about 300 KPa to about 600 KPa.

These diene-modified olefin polymers may generally have a number average molecular weight (Mn) within the range of about 500 to 250,000, more preferably from about 5,000 to about 150,000.

A second category of olefin polymers useful in preparing the stabilizers of this invention include homopolymers of $C_2$ to $C_{20}$ monoolefins and copolymers thereof which contain unsaturation at the terminal position of the polymer chain. These polymers are also known in the art and are commonly produced with single site catalyst systems which typically comprise a metallocene (bridged or unbridged species wherein the cyclopentadienyl group(s) are substituted or unsubstituted and are the same or different; the bridging group may also be substituted or unsubstituted) and either an organoaluminum cocatalyst or an ionic activator component, The catalyst system may also be prepolymerized with the olefin monomer(s) if so desired, The catalyst employed may optionally be supported on an inert, organic or inorganic media. The catalysts chosen may be placed on a supported-media by methods generally known to those skilled in the art.

The metallocenes which may be employed to prepare the catalysts comprise one or a mixture of organometallic coordination compounds which are cyclopentadienyl derivatives of Group 4b, 5b, or 6b metals of the Periodic Table. These metallocene compounds include mono, di and tricyclopentadienyls and their derivatives of the transition metals. Particularly preferred are the metallocenes of Group 4b or 5b metals such as titanium, zirconium, hafnium and vanadium.

Some preferred metallocenes are bis(cyclopentadienyl)zirconium; dimethyl bis(cyclopentadienyl) zirconium dichloride; bis(cyclopentadienyl) titanium dichloride; bis(methylcyclopentadienyl) zirconium dichloride; bis(methylcyclopentadienyl) titanium dichloride; bis(n-butylcyclopentadienyl)zirconium dichloride; dimethylsilyldicyclopentadienyl zirconium dichloride; bis(trimethylsilycyclopentadienyl) zirconium dichloride; and dimethylsilyldicyclo- pentadienyl titanium dichloride; bis(indenyl) zirconium dichloride; bis (4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethyl- silyl-bridged bis(4,5,6,7-tetrahydroindenyl) zirconium dichloride; and the racemic and/or meso isomer of 1,1-dimethylsilyl-bridged bis(methyl- cyclopentadienyl) zirconium dichloride. Monocyclopentadienyl zirconium may also be employed.

The alumoxanes are known materials and comprise oligomeric, linear alumoxanes of the formula:

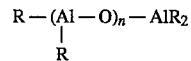

or oligomeric, cyclic alumoxanes of the formula:

wherein n is 1–40, m is 3–40, and R and $R_2$ are independently an alkyl group having from 1–5 carbon atoms.

The alumoxane can be prepared in various ways. Preferably, they are prepared by contacting water with a solution of aluminum trialkyl, such as, for example, aluminum trimethyl, or aluminum triethyl, in a suitable organic solvent such as toluene or an aliphatic hydrocarbon. For example, the aluminum alkyl may be treated with water in the form of a moist solvent. In an alternative method, the aluminum alkyl such as aluminum trimethyl can be desirably contacted with a hydrated salt such as hydrated copper sulfate or ferrous sulfate. The water may be contained in a carrier such as silica. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in an alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1. It is preferred that if an ionic catalyst system, such as that described in EPA 0277004, is employed in the instant invention, that the molar ratio of of first component (cation), to second component (anion) be 1:1 or greater.

The polyolefin polymers containing terminal unsaturation may be prepared by any suitable process known in the art such as gas, bulk, solution, slurry or high pressure polymerization techniques. Polymerization in solution or in the gas phase is preferred.

The solvents used in the preparation of the catalyst system are inert hydrocarbons, in particular a hydrocarbon that is inert with respect to the catalyst system. Such solvents are well known and include, for example isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol etc., or cooling or flashing the medium to terminate the polymerization reaction), the product polymer can be recovered by processes well known in the art. Any excess reactants may be flashed off from the polymer.

Techniques known to those skilled in the art for manipulating molecular weight may be employed in the inventive process. If so desired, the polymerization may be carried out in the presence of hydrogen to lower the polymer molecular weight. Care should be taken to assure that terminal ethenylidene unsaturation is not eliminated in the polymer chains. Due to the possibility of hydrogen saturating the terminal groups, it is preferred that the polymers be formed in the substantial absence of added $H_2$ gas.

When carrying out the polymerization in a batch-type fashion, the reaction diluent (if any), and the monomer or mixture of monomers are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is formed, additional monomers may be added to the reactor. Upon completion of the reaction, unreacted monomer and solvent are either flashed or distilled off, if necessary by vacuum, and the low molecular weight polymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

The olefin polymers containing terminal unsaturation employed in this invention are further characterized in that up to about 95% and more of the polymer chains may possess terminal ethenylidene-type unsaturation. Thus, one end of such polymers will be of the formula POLY-$C(T^1)$=$CH_2$ wherein $T^1$ is $C_1$ to $C_{16}$ alkyl, preferably $C_1$ to $C_6$ alkyl, and more preferably $C_1$ to $C_2$ alkyl, (e.g., methyl or ethyl) and wherein POLY represents the polymer chain. The chain length of the $T^1$ alkyl group will vary depending on the comonomer(s) selected for use in the polymerization. A minor amount of the polymer chains can contain terminal ethenyl unsaturation, i.e. POLY-CH=$CH_2$, and a portion of the polymers can contain internal monounsaturation, e.g. POLY-CH=CH($T^1$), wherein $T^1$ is as defined above. Polymers which include a non-conjugated diene component may contain both terminal 4 and internal monounsaturation. Preferably at least about 10 percent, more preferably at least about 50 percent, and most preferably at least about 75 percent (e.g. 75–98%), of such polymer chains exhibit terminal ethenylidene unsaturation. The percentage of polymer chains exhibiting terminal ethenylidene unsaturation may be determined by FTIR spectroscopic analysis, titration, or $C^{13}$NMR or $H^1$NMR.

The terminally unsaturated polymers and the composition employed in this invention may be prepared as described in U.S. Pat. No. 4,668,834 and in European Patent Publications 128,046, 129,368 and 0260999, the complete disclosures of which are incorporated herein by reference. Other ionic-type activators which may be used to activate the metallocene catalyst component are disclosed in European patent applications 0,277,003 and 0,277,004, the complete disclosures of which are incorporated herein by reference.

Polymers prepared as described above and having terminal unsaturation useful for the purposes of this invention include polyethylene, polypropylene polybutene as well as copolymers of ethylene with one or more $C_3$ to $C_{20}$ alpha monoolefins such as propylene, 1-butene, 1pentene, 1-hexene, 1-octene, norbornene and the like, as well as olefin copolymers which also include a diene as described above such as 1,7-octadiene, 1,4-hexadiene and ethylidene-norbornadiene. In the case of ethylene copolymers, the molar ethylene content is preferably in the range of between about 20 and 80 percent, and more preferably between about 30 to about 70 percent. When propylene, butene-1 or other monomers are employed as comonomer(s) with ethylene, the ethylene content of such copolymers is most preferably between about 45 and about 65 percent, although higher or lower ethylene contents may be present.

The olefin polymers containing terminal unsaturation may be of low, medium or high density and may be amorphous or crystalline as a function of the process conditions under which they are produced and the monomer composition. These polymers may have a number average molecular weight ($M_n$) in the range of about 500 to about 50,000, more preferably from about 500 to about 30,000, and most preferably from about 1000 to about 10,000. These olefin polymers generally possess an intrinsic viscosity (as measured in tetralin at 135° C.) of between about 0.025 and about 0.9 dl/g., more preferably between about 0.075 and about 0.4 dl/g. The most preferred Mn for these polymers ranges from about 1,000 to about 7,000.

Compounds which may be alkylated using the above described olefin polymers include phenol or substituted phenols or substituted aromatics of the following general formulas:

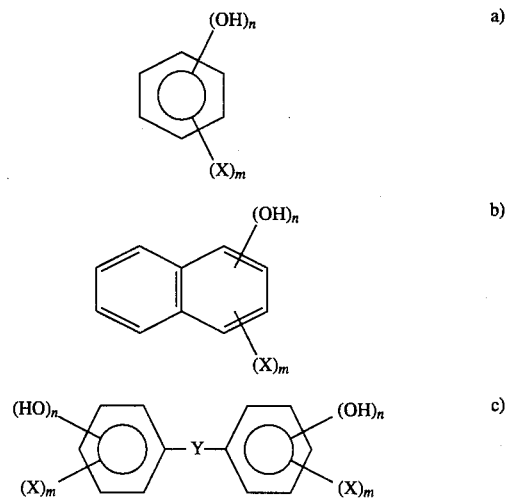

wherein X is selected from the group consisting of $C_1$ to $C_4$ alkyl and hydrogen, Y is selected from the group consisting of a direct link, O, S, S—S, SO, $SO_2$, Si and $C_1$ to $C_3$ alkylidene, n is 0,1 or 2 and m is 0, 1 or 2, provided that n is at least 1 when and m is O and X is hydrogen when and m is O.

Examples of suitable phenolic compounds include phenol, 2,6-dimethyl phenol, bisphenol A, 2-methylphenol, 1,5-dihydroxynaphthalene, 1,4dihydroxy benzene, 4,4'-dihydroxydiphenyl- sulfone and 4-methoxy phenol.

Examples of suitable substituted aromatic compounds include toluene, ethyl benzene, tertiary butyl benzene, anisole as well as alkyl or alkoxy substituted naphthalenes or biphenyls.

The reaction between the terminally unsaturated olefin polymer and the phenolic compound is an electrophilic aromatic substitution reaction which, in the case where an ethylene/propylene copolymer is the olefin polymer and phenol is the phenolic reactant, may be represented by the following equation:

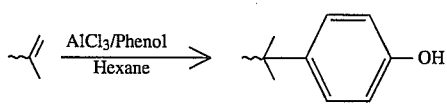

The reaction is conducted in the melt or in solution by contacting the polymer and phenolic reactants with catalytic quantities of an acid catalyst at temperatures of from about 20° to 200° C., more preferably from 20° to about 100° C. Suitable catalysts include $BF_3$ or $BF_3$ complexes, sulfuric acid, hydrochloric acid, sulfonic acid, hydrofluoric acid, pyrophosphoric acid, tetraphosphoric acid, arylsulfonic acids and halides of aluminum, titanium, zinc or tin. Preferred acids are Friedel Crafts or Lewis Acid type catalysts. Solvents which may be employed include aliphatic, cycloaliphatic and aromatic hydrocarbons or halohydrocarbons in which the polymer reactants are soluble such as n-hexane, cyclohexane, monochlorobenzene, dichlorobenzene, trichlorobenzene, toluene, xylene, and the like.

The phenolic or aromatic reactant and the polymer may be present in the reaction media at the respective ratio of from about 1.0 to about 15 moles of reactant per mole of polymer. An excess of about 2:1 to 15:1 molar concentration of the phenolic or aromatic reactant is preferred, most preferably an excess of about 3:1 to 7:1.

As indicated above, this reaction product may be characterized as a polymer product containing the aromatic or phenolic moiety at the terminal position of at least some of the polymer chains. In the case of phenol and 2,6-dimethyl phenol and monosubstituted benzenes, alkylation takes place at the aromatic site para to the hydroxyl or benzene substituent group. This structure is a factor in preventing and minimizing discoloration of the matrix polymer into which the reaction product is incorporated as a stabilizer. Thus, utilization of the terminally unsaturated olefin polymers provides the advantage that well defined polymeric stabilizers containing the phenolic or aromatic moiety positioned only at the terminus of the polymer chain can be produced.

It is also possible to produce polymeric stabilizers having the phenolic or aromatic moieties positioned randomly along the polymer chain as well as at the terminal position. This may be accomplished by utilizing as a random copolymer of at least one olefin and a diene as the starting olefin polymer. In that case, double bonds will be present along the polymer chain and, after alkylation, the phenolic or aromatic moieties will be randomly distributed at positions where some of these double bond sites were present. Where the diene-containing polymer is polymerized using the metallocene catalyst system described above, then a polymer containing both terminal unsaturation and random unsaturation along the polymer chain may be obtained.

Matrix olefin polymer compositions which can be stabilized by mixing therewith the above-described polymeric stabilizers of this invention include amorphous and crystalline polymers having a number average molecular weight in the range of from about 10,000 up to about 2,000,000 and which contain polymerized $C_2$ to $C_{20}$ monolefins. These polymers include homopolymers such as ethylene, propylene and isobutylene homopolymers, as well as copolymers of ethylene with one or more alpha olefins having from 3 to 20 carbon atoms. Such materials include high, medium and low density polyethylene, isotactic polypropylene, plastic and elastomeric copolymers of ethylene and propylene, polybutene, butyl rubber and copolymers of ethylene, propylene and a non-conjugated diene. Preferably the stabilizer and matrix polymer are selected such that polymer materials are the most compatible. Most preferably, the polymer component of the stabilizer is of the same species and morphology as the polymer material to which the stabilizer is added.

The olefin polymer stabilizers of this invention may be blended with the matrix olefin polymer at levels sufficient to impart stability to the polymer matrix, generally in the range of from about 0.05 to about 3% by weight, more preferably from about 0.1 to about 1.5% by weight. The most preferred level of addition is from about 0.1 to about 1.0% by weight.

The polymeric stabilizers may also be employed in admixture with one or more conventional olefin polymer stabilizers known in the art. Examples include the acid esters such as dilaurylthiodipropionate or distearylthiodi- propionate; tetrakis [methylene(3,5-di-tert- butyl-4-hydroxyhydrocin- namate)] methane (IRGANOX 1010); tris (2,4-ditert-butylphenyl)phosphate (IRGATOS 168); tetrakis (2,4-di-tert-butylphenyl-4,4'-biphenylene) diphosphonite (IRGATOS P-EPO); and like materials as well as mixtures thereof.

The optimum level of stabilizer addition is a function of the molecular weight of the polymeric reactant used to prepare it and the concentration of the phenolic or aromatic groups present in the stabilizer. The higher the molecular weight of the polymer containing terminal unsaturation, the lower the concentration of the phenolic or aromatic groups present in the stabilizer composition, and vice versa. Optimum molecular weight (Mn) of the polymer component of the stabilizer lies within the range of from about 1,000 to about 5,000. The matrix olefin polymer and stabilizer may be blended by any known technique which provides for an intimate admixture of components, such as melt blending. The materials may be dry blended and processed in an extruder or other heat shaping device, or mixtures may be formed in a Banbury or extruder mixer. Melt blending at a temperature above the melting points of the blend components, i.e., above about 200° C., is preferred.

The following Examples are illustrative of the invention.

EXAMPLE 1

In this example, 2,6-dimethyl phenol is alkylated using a terminally unsaturated copolymer of ethylene and 41% by weight propylene produced using the metallocene/alumoxane catalyst system described above. The copolymer had a number average molecular weight (Mn) of 3,700, and greater than 75% by weight of the polymer chains contained terminal ethenylidene unsaturation.

Into a dry 3-necked flask equipped with a condenser, stirrer and nitrogen inlet were added 55.6 gms (0.015m) of the terminally unsaturated ethylene/propylene copolymer and 400 ml of anhydrous cyclohexane to form a solution. To this solution was added 18.3 gms (0.15m) of 2,6-dimethyl phenol and the mixture was stirred for 5 minutes. 10.0 gms (0.075m) of aluminum chloride was next added and the mixture was stirred for two hours at ambient conditions under a blanket of nitrogen. The polymeric reaction product was isolated by precipitation using an excess of methanol. The product was stirred with methanol overnight, the methanol was discarded and the product was dried. The product was then purified by dissolving it in hexane and the hexane solution was dried over anhydrous magnesium sulfate. The purified polymer product was then isolated by the evaporation of hexane and it was dried in a vacuum oven at 50° C.

Analysis of the product using proton NMR spectroscopy showed that the phenolic reactant was quantitatively functionalized with the polymer reactant positioned primarily para to the hydroxyl group.

EXAMPLE 2

Example 1 was repeated except that the polymeric reactant used was a terminally unsaturated isotactic polypropylene having a number average molecular weight of about 4,000 and the solvent employed was 1,2,4-trichlorobenzene.

The reaction product was characterized as a polypropenyl 2,6-dimethyl phenol with alkylation occurring primarily para to the phenolic hydroxyl group.

EXAMPLE 3

In this example, toluene is alkylated with a terminally unsaturated copolymer of ethylene and propylene produced using the metallocene catalyst system described above.

The reactions were carried out in a dry 3-necked flask equipped with a stirrer and a nitrogen inlet. 2.15 gms. (0.001 m) of the terminally unsaturated copolymer of ethylene and propylene having a number average molecular weight of 2,200 (MWD-2.7) was dissolved in 20 ml. of anhydrous toluene at ambient temperature. To this solution was added 1.4 gms. (0.01 m) of aluminum chloride and the reaction mixture was stirred for one hour at ambient temperature under a blanket of nitrogen. The end-functionalized EP copolymer was isolated by precipitation in a large quantity of methanol. This polymer was dried in a vaccum oven at 60° C. for 36 hours. The proton NMR spectroscopy indicated complete conversion of the terminal double bonds to p-methyl benzene group. The number average molecular weight and the MWD was found to be 3,800 and 2.5 respectively by GPC analysis. The stabilizer has utility as a radiation stabilizer for matrix resin systems to which it is added due to the ability of the aromatic moieties to absorb radiation.

The effectiveness of the polymer reaction products of this invention as heat stabilizers for polyolefin polymers is illustrated in the following Examples. A Ziegler catalyzed polypropylene polymer was used as the matrix polymer.

EXAMPLE 4

3000 g of isotactic polypropylene granules having a M(w) of 180,364, a M(n) of 55,935 and a polydispersity ($M_w/M_n$) of 3.2 were combined with 10,800 ppm (about 1.1% by weight) of the stabilizer of Example 1 and 500 ppm (0.05% by weight) of calcium stearate which functions as an extrusion processing aid. The mixture was dry blended and kneaded to assure that the additives are uniformly dispersed on the polypropylene granules.

The polymer composition was extruded on an extruder with a screw diameter of 1 inch. The screw rotated at 52 rpm and the extruder drive was 3.6 to 3.8 amps. A 325 fine screen pack was used to simulate the shear stress encountered in manufacturing. The extrusions were done in an air atmosphere. The temperature of the melt was recorded prior to the die. The average residence time was 30 seconds. The extruded strand was cooled in water and pelletized. The pelletized material was blended and samples collected for melt flow rate determinations. The remaining material was then re-extruded. The first extrusion was done at 450° F. to simulate production pelletization temperatures. This extruded material sample was labeled "initial". The next five extrusions were at 500° F. to simulate typical fabrication and reprocessing temperatures and the samples were labeled 1 through 5 consecutively. Samples were collected after each extrusion for color analysis and melt flow rate determinations.

EXAMPLE 5

Example 4 was repeated exactly as set forth except the quantity of stabilizer employed was reduced to 500 ppm (0.05% by weight). The extrusions were repeated a total of six times as set forth in Example 3.

CONTROL

A control extrusion of polypropylene was performed exactly as set forth in Example 4 except that the stabilizer was eliminated entirely from the formulation. The extrusions were repeated a total of six times as set forth in Example 4.

Melt flow rate (MFR) was determined for the initial polypropylene and after the initial extrusion and extrusions 1,3 and 5. MFR was measured in g/10 min. of polymer that flows through an orifice under a 2.16 kg. weight at 230° C.

Yellowness Index (YI) was selected as the best method of measuring the change of color of the pelletized resins. The index was determined under ASTM D-1925. The Yellowness Index of each of the above samples was determined after each extrusion.

Results of melt flow testing and color testing on samples produced after each extrusion for Examples 4 and 5 as well as the Control are shown in Table 1.

TABLE 1

| STATUS | EXTR. TEMP (F.) | CONTROL | | EX. 4 | | EX. 5 | |
|---|---|---|---|---|---|---|---|
| | | YI | MFR | YI | MFR | YI | MFR |
| Before Extrusion | — | — | 3.0 | — | 3.0 | — | 3.0 |
| Initial | 450 | −4.9 | 7.4 | 0.1 | 6.3 | −1.5 | 10.3 |
| 1 | 600 | −4.2 | 16.5 | 2.2 | 8.8 | −0.7 | 16.1 |
| 2 | 500 | −4.2 | NT | 3.4 | NT | −0.2 | NT |
| 3 | 500 | −3.7 | 49.6 | 4.3 | 14.1 | −0.2 | 30.1 |
| 4 | 500 | −3.0 | NT | 5.0 | NT | 0.1 | NT |
| 5 | 500 | −2.4 | 99.8 | 5.5 | 20.4 | 0.6 | 37.3 |

This data shows that the Control sample exhibited considerable polymer degradation after the fifth extrusion as reflected by an increase of MFR from 3.0 to 99.8. GPC data shows that this translates into a molecular weight reduction as shown in Table II.

TABLE II

| Polypropylene | Before Extrusion | After 5th Extrusion |
|---|---|---|
| Mw | 180,364 | 99,185 |
| Mn | 55,935 | 40,274 |
| Mw/Mn | 3.2 | 2.5 |

In contrast, the samples of Examples 4 and 5 exhibited considerably less polymer degradation as reflected by an MFR of only 20.4 and 37.3 respectively after the fifth extrusion.

Yellowness index values for the control show that very little discoloration was encountered over the extrusion cycles as would be expected. Negative values indicate little yellowing whereas positive values indicate a degree of yellowing, the degree of yellowing being reflected by the extent that the value exceeds 0. YI values for Example 5 where the polymer composition contains lesser quantities of the stabilizer are quite good. The composition of Example 4 exhibits some yellowing but these values are acceptable and comparable to what is achieved with other commercially available stabilizer systems.

What is claimed:

1. A heat stabilizer composition comprising the acid catalyzed reaction product of:

i) at least one aromatic compound selected from the group consisting of compounds represented by one of the following formulae:

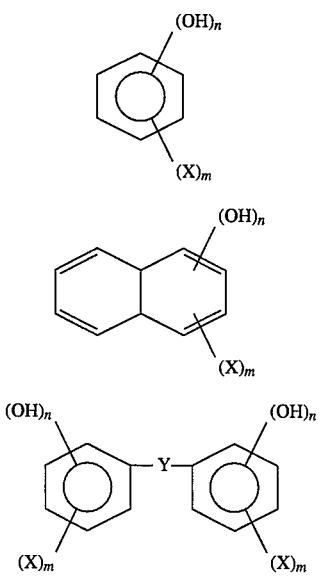

wherein X is selected from the group consisting of $C_1$ to $C_4$ alkyl, Y is selected from the group consisting of a direct link, O, S, S—S, SO, $SO_2$, Si and $C_1$ to $C_3$ alkylidene; and n is 0, 1, or 2, and m is 1 or 2; and ii) a heat stabilizer base material comprising an olefin polymer, said polymer having at least 10% terminal unsaturation, said polymer selected from the group consisting of:
a) crystalline and amorphous homopolymers having an $M_n$ of about 4000 to about 50,000; and
b) crystalline and amorphous copolymers of $C_2$ to $C_{20}$ monoolefins having an $M_n$ of 3,700 to about 50,000.

2. The composition of claim 1 wherein said aromatic compound and said heat stabilizer base material are present in the ratio of about 1.0 to about 15.0 moles of said aromatic compound per mole of heat stabilizer base material.

3. The composition of claim 1 wherein said aromatic compound and said heat stabilizer base material are present in the ratio of about 3.0 to about 7.0 moles of said aromatic compound per mole of said heat stabilizer base material.

4. The composition of claim 1 wherein said aromatic compound is phenolic and is selected from the group consisting of 2,6-dimethyl phenol, bisphenol A, 2-methylphenol, 1,5-dihydroxynaphthalene, 1,4-dihydroxybenzene, 4,4'-dihydroxydiphenylsulfone, and 4-methyloxyphenol.

5. The composition of claim 1 wherein said heat stabilizer base material is selected from a group consisting of crystalline homopolymers of $C_2$ to $C_4$ monoolefins, and copolymers of ethylene and at least one $C_3$ to $C_{20}$ monoolefin.

6. The composition of claim 1 wherein said heat stabilizer base material is produced using a metallocene/alumoxane catalyst system.

7. The composition of claim 1 wherein said heat stabilizer base material has a number average molecular weight no higher than about 10,000.

8. The composition of claim 1 wherein said heat stabilizer base material is a copolymer of ethylene and propylene.

9. The composition of claim 1 wherein said heat stabilizer base material is polypropylene.

10. A heat stabilized olefin polymer composition comprising a mixture of:
(a) an olefin matrix polymer, having a number average molecular weight of from about 10,000 up to about 200,000, said olefin matrix polymer selected from the group consisting of: i) amorphous and crystalline homopolymers and copolymers of $C_2$ to $C_{20}$ monoolefins, and ii) copolymers of ethylene, propylene and a non-conjugated diene; and
(b) a stabilizing amount of the heat stabilizer composition of claim 1.

11. The composition of claim 10 wherein said matrix polymer is selected from a group consisting of homopolymers of $C_2$ to $C_4$ monoolefins and copolymers of ethylene with at least one $C_3$ to $C_{20}$ monoolefin.

12. The composition of claim 10 wherein said matrix polymer is polyethylene.

13. The composition of claim 10 wherein said matrix polymer is polypropylene.

14. The composition of claim 10 wherein the phenolic compound in the heat stabilizer composition is selected from the group consisting of 2,6, -dimethyl phenol, bisphenol A, 2-methylphenol, 1,5-dihydroxynaphthalene, 1,4-dihydroxybenzene, 4,4'-dihydroxydiphenylsulfone, and 4-methyloxyphenol.

15. The composition of claim 14 wherein said heat stabilizer composition is blended with said matrix polymer at a level within the range of about 0.05 to about 3% by weight.

16. A method for enhancing the heat stability of an olefin polymer composition comprising blending:
a) an olefin matrix polymer, having a number average molecular weight of from about 10,000 up to about 200,000, said olefin matrix polymer selected from the group consisting of amorphous or crystalline homopolymers and copolymers of $C_2$ to $C_{20}$ monoolefins; with
b) a stabilizing amount of a heat stabilizer composition comprising:
i) the acid catalyzed reaction product of at least one compound having a structure selected from the group consisting of compounds represented by one of the following formulae:

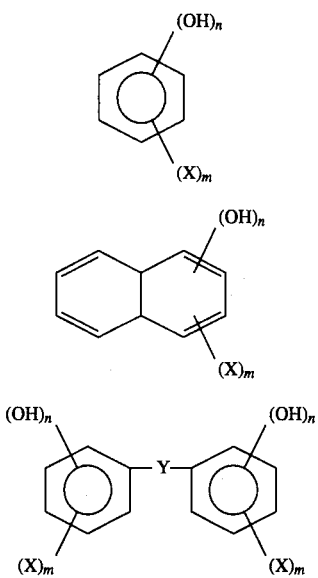

wherein X is selected from the group consisting of $C_1$ to $C_4$ alkyl, Y is selected from the group consisting of a direct link, O, S, S—S, SO, $SO_2$, Si and $C_1$ to $C_3$ alkylidene; and n is 0, 1, or 2, and m is 1 or 2; and ii) a heat stabilizer base material comprising an olefin polymer, said polymers having at least 10% terminal unsaturation, said polymer selected from the group consisting of:
a) crystalline and amorphous homopolymers having an $M_n$ of about 4000 to about 50,000; and
b) crystalline and amorphous copolymers of $C_2$ to $C_{20}$ monoolefins having an $M_n$ of 3,700 to about 50,000.

17. The method of claim 16 wherein said heat stabilizer composition is blended with said matrix polymer at a level within the range of about 0.05 to about 3% by weight.

18. The method of claim 16 wherein said aromatic compound and said heat stabilizer base material are present in the ratio of about 1.0 to about 15.0 moles of said aromatic compound per mole of heat stabilizer base material.

19. The method of claim 16 wherein the aromatic compound is phenolic and is selected from the group consisting of 2,6,-dimethyl phenol, bisphenol A, 2-methylphenol, 1,5-dihydroxynaphthalene, 1,4, -dihydroxybenzene, 4,4'-dihydroxy- diphenylsulfone, and 4-methyloxyphenol.

20. The method of claim 16 wherein said heat stabilizer base material is selected from the group consisting of crystalline homopolymers of $C_2$ to $C_4$ monoolefins, and copolymers of ethylene and at least one $C_3$ to $C_{20}$ monoolefin.

21. The method of claim 16 wherein said heat stabilizer base material has a number average molecular weight less than about 10,000.

22. The method of claim 16 wherein said heat stabilizer base material has a number average molecular weight less than about 5,000.

23. The method of claim 16 wherein said heat stabilizer base material is a copolymer of ethylene and propylene.

24. The method of claim 16 wherein said heat stabilizer base material is polypropylene.

25. The composition of claim 1 wherein said heat stabilizer base material has at least 50% terminal unsaturation.

26. The composition of claim 1 wherein said heat stabilizer base material has at least 75% terminal unsaturation.

27. The composition of claim 2 having at least 50% terminal unsaturation.

28. The composition of claim 2 having at least 75% terminal unsaturation.

* * * * *